United States Patent
Klein et al.

(10) Patent No.: US 10,783,242 B2
(45) Date of Patent: Sep. 22, 2020

(54) METHOD AND SEMICONDUCTOR CIRCUIT FOR PROTECTING AN OPERATING SYSTEM OF A SECURITY SYSTEM OF A VEHICLE

(71) Applicant: AUDI AG, Ingolstadt (DE)

(72) Inventors: Markus Klein, Pförring (DE); Kamil Zawadzki, Munich (DE); Changsup Ahn, Ingolstadt (DE); Hans-Georg Gruber, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/609,104

(22) PCT Filed: Oct. 17, 2018

(86) PCT No.: PCT/EP2018/078427
§ 371 (c)(1),
(2) Date: Oct. 28, 2019

(87) PCT Pub. No.: WO2019/081308
PCT Pub. Date: May 2, 2019

(65) Prior Publication Data
US 2020/0250301 A1 Aug. 6, 2020

(30) Foreign Application Priority Data
Oct. 26, 2017 (DE) .................. 10 2017 219 241

(51) Int. Cl.
*G06F 21/53* (2013.01)
*G06F 21/62* (2013.01)

(52) U.S. Cl.
CPC .......... *G06F 21/53* (2013.01); *G06F 21/6281* (2013.01); *G06F 2221/033* (2013.01)

(58) Field of Classification Search
CPC ...................................... G06F 21/53
See application file for complete search history.

(56) References Cited

U.S. PATENT DOCUMENTS

| | | | | |
|---|---|---|---|---|
| 5,243,322 A | * | 9/1993 | Thompson | .......... B60R 25/1004 307/10.2 |
| 5,382,948 A | * | 1/1995 | Richmond | .............. B60R 25/04 180/287 |
| 2009/0119657 A1 | | 5/2009 | Link, II | |

(Continued)

FOREIGN PATENT DOCUMENTS

| | | |
|---|---|---|
| CN | 101673332 A | 3/2010 |
| DE | 102005048595 A1 | 4/2007 |
| DE | 102006054705 A1 | 5/2008 |

OTHER PUBLICATIONS

International Search Report and Written Opinion of the International Searching Authority directed to related International Patent Application No. PCT/EP2018/078427, dated Dec. 11, 2018, with attached English-language translation; 21 pages.

(Continued)

*Primary Examiner* — Bradley W Holder
(74) *Attorney, Agent, or Firm* — Sterne, Kessler, Goldstein & Fox P.L.L.C.

(57) ABSTRACT

The disclosure relates to a method for protecting an operating system of a security system, which is stored in a working memory of a control device of a vehicle, against irregular modification.

16 Claims, 3 Drawing Sheets

(56) References Cited

U.S. PATENT DOCUMENTS

| | | | |
|---|---|---|---|
| 2009/0300254 A1 | 12/2009 | Newald et al. | |
| 2012/0060220 A1* | 3/2012 | Kerseboom | G06F 21/566 726/24 |
| 2012/0204059 A1* | 8/2012 | Preston | G06F 11/3051 714/10 |
| 2013/0246685 A1* | 9/2013 | Bhargava | G06F 21/00 711/6 |
| 2016/0352756 A1 | 12/2016 | Peeters et al. | |

OTHER PUBLICATIONS

Williams, Paul D., "CuPIDS: Increasing Information System Security Through the Use of Dedicated Co-processing," Jan. 1, 2005, available at: https://apps.dtic.mil/dtic/tr/fulltext/u2/a440440.pdf; 126 pages.

Kourai, Kenichi & Nagata, Takuya, "A Secure Framework for Monitoring Operating Systems Using SPEs in Cell/B.E.," 2012 IEEE 18th Int'l. Symp. on Dependable Computing, IEEE, Nov. 18. 2012, pp. 41-50.

International Preliminary Report on Patentability directed to related International Patent Application No. PCT/EP2015/078427, completed Jul. 22, 2019, with attached English-language translation; 12 pages.

Chinese Application No. 201880025581.0, Office Action dated Jun. 10, 2020, English Translation from EPO Global Dossier, 13 pages.

\* cited by examiner

METHOD AND SEMICONDUCTOR CIRCUIT FOR PROTECTING AN OPERATING SYSTEM OF A SECURITY SYSTEM OF A VEHICLE

TECHNICAL FIELD

The disclosure relates to a method for protecting an operating system of a security system, which is stored in a working memory of a control device of a vehicle, against irregular modification.

BACKGROUND

Typically, a vehicle comprises a plurality of different functional systems that increase the safety of the vehicle in road traffic or the comfort of occupants of the vehicle. The security systems (safety) of the vehicle include, for example, a braking system and an engine control, while an infotainment system and an air conditioning system are considered to be part of the comfort systems of the vehicle.

Each functional system usually comprises at least one device arranged in the vehicle and an operating system (OS) corresponding to the device, which has a control logic for the device and is stored and executed in a control device of the vehicle. The operating system of this disclosure comprises an operating system in the narrower sense (for example, a Linux kernel) and/or at least one specific application program related to the respective device.

The at least one corresponding device, which is naturally arranged in the vehicle at a distance from the control device, is connected bidirectionally to the control device, usually via a specific bus system. Control data or status data are exchanged via the bus system between the operating system stored in the control device and the at least one corresponding device.

The control device and the at least one device are each connected to the bus system by means of a suitable interface. Particularly in the case of a security system of the vehicle, the bus system and the interfaces must at any time ensure a real-time communication between the operating system and the at least one corresponding device.

For example, DE 10 2005 048 595 A1 discloses a so-called FlexRay interface, by means of which a FlexRay participant, i.e., a control device or a device of the vehicle, can be connected to a FlexRay bus. On the side of the participant, the FlexRay interface comprises an input buffer memory and an output buffer memory, each having a partial buffer memory and a shadow memory corresponding to the partial buffer memory. By an alternating read or write access of the FlexRay participant to the partial buffer memory and the shadow memory of the input buffer memory or the output buffer memory of the FlexRay interface, the data transmission between the FlexRay participant and the FlexRay bus can be accelerated.

In addition to a fast data exchange via the bus system, especially an integrity of its operating system in the control device must always be ensured for a correct functioning of a functional system. The integrity is a necessary requirement for an error-free execution of the operating system stored in the working memory of the control device. It can be achieved by a corresponding protection system (security) for the operating system.

For example, if an operating system is updated online during a drive of the vehicle, undefined intermediate states of the operating system can occur in the working memory of the control device, which can impair its proper functioning, particularly in the case of extensive operating systems and a correspondingly long update duration.

For protection against such malfunctions during an update, U.S. patent application 2009/0119657 discloses a method for updating application programs in a working memory of a control device of a vehicle. In the method, an updated version of an application program can first be stored in a buffer memory, called "shadow memory," of the control device to preclude a malfunction of the vehicle due to an undefined intermediate state of the corresponding application program in case of an extensive update during a drive of the vehicle. The updated version of the operating system stored in the "shadow memory" is then mirrored into the working memory upon the next start of the vehicle, i.e., before the start of the drive, in order to take effect.

In modern vehicles, a plurality of control devices is increasingly combined in a central control device (electronic control unit, ECU). The central control device has a working memory, in which a plurality of operating systems is stored simultaneously and executed in parallel. This configuration is usually termed virtualization. Accordingly, an operating system with this configuration is called "virtualized."

In this case, the integrity of an operating system in the working memory of the control device can be affected by other operating systems stored in the working memory of the control device. For example, by overwriting, an operating system can modify memory areas of a further operating system either intentionally, i.e., in the course of a targeted attack, or unintentionally, i.e., as a result of a programming error.

This risk is further increased by the fact that different functional systems of a vehicle are usually supplied by different manufacturers, and operating systems of different manufacturers are thus simultaneously stored and executed in the working memory of the control device. In addition, operating systems provided independently of each functional system of the vehicle and provided by previously unknown manufacturers, for example, for free surfing of the Internet, can be stored and executed in the working memory of the control device. Protection against a mutual modification of a plurality of operating systems stored and executed in the working memory, even from different manufacturers, can be effected in different ways.

DE 10 2006 054 705 A1, for example, discloses a method for operating an application program stored in a working memory of a control device of a vehicle, the application program comprising a plurality of program portions of different origin. Each program portion is stored in a separate working memory area. In order to prevent an irregular modification of a program portion stored in a first working memory area by a program portion stored in a second working memory area and thus a malfunction of the application program, the method defines access rights for each program portion of the application program in relation to the working memory areas. If a program portion has to be modified as part of a regular update, the corresponding memory area can also be mirrored into a shadow memory for protection purposes.

A modern central control device can also comprise a highly integrated semiconductor circuit (system on chip, SoC) which combines all the functions required for parallel execution of multiple virtualized operating systems in one component, particularly a working memory and one or more processors operating in the working memory. If operating systems of security systems and operating systems of comfort systems are simultaneously stored and executed in parallel on the highly integrated semiconductor circuit, it must be ensured that the operating systems of the security systems are protected against irregular modification, while conventional functionalities of the comfort systems must not be restricted or excluded by a protection system.

A common measure in highly integrated semiconductor circuits is the use of a so-called hypervisor (virtual machine monitor, VMM) as a protection system for the working memory. A hypervisor is configured to monitor and, if necessary, prevent access to the working memory. It is therefore particularly well-suited for virtualized systems in order to separate several operating systems simultaneously stored and executed in parallel in a working memory. However, the working memory can be affected by the accesses of the hypervisor which are continuously required in the course of the monitoring and can lead to errors when executing a hypervised operating system.

However, this is unacceptable in the case of an operating system of a security system. Furthermore, a hypervisor itself can also be the target of an irregular modification or irregularly modify the monitored memory area as a result of a programming error. Therefore, a hypervisor must comply with the international standard ISO 26262, which must be confirmed for the first time by an ASIL certification prior to activation and subsequently regularly for each update. However, especially with regard to a usually high update frequency of the hypervisor, the ASIL certification represents a practically insurmountable hurdle, which is why a hypervisor is unsuitable for monitoring a security-critical operating system on a highly integrated semiconductor circuit.

DETAILED DESCRIPTION

Figure 1:
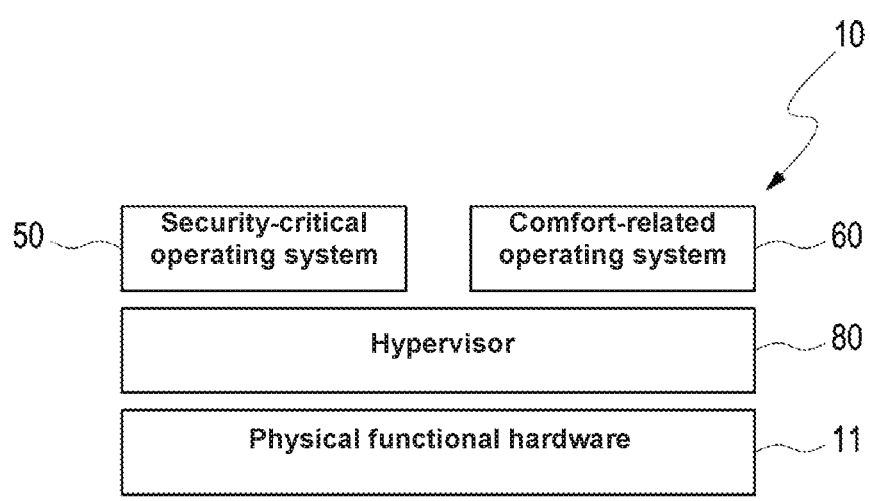
FIG. 1 shows a schematic block diagram of a non-practical semiconductor circuit.

The present disclosure addresses the problem of proposing an improved method for protecting a security system against irregular modifications, which avoids the disadvantages described. The disclosure further addresses the problem of creating a highly integrated semiconductor circuit which is suitable for executing such a method.

A subject matter of the present disclosure is a method for protecting an operating system of a security system, which is stored in a working memory of a control device of a vehicle, against irregular modification.

In the method according to the disclosure, at least one working memory area, which stores at least a portion of the operating system of the security system, is mirrored by a shadow memory manager from the working memory into a shadow memory. The shadow memory manager constitutes a functional module that is designed to establish identity between a first specific memory area and a second specific memory area, i.e., to mirror the first specific memory area into the second specific memory area. As a result of the mirroring, a shadow memory area exists in the shadow memory which constitutes an identical image of the mirrored working memory area. As such, the shadow memory area also stores the at least one mirrored portion of the security system. For example, the portion can be a single application program of the security-critical operating system.

Furthermore, according to the disclosure, a shadow memory area corresponding to the at least one mirrored working memory area is monitored. When the working memory area shows an irregular modification, the shadow memory area shows the same irregular modification due to the content identity of the working memory area and the shadow memory area. However, access by a protection system to the shadow memory area for monitoring cannot affect the mirrored working memory area. For example, a protection system could irregularly modify the monitored memory area due to a programming error. Therefore, if a portion of an operating system of a security system is stored in the mirrored working memory area, both a correct execution of the security system and a monitoring of the mirrored portion of the security-critical operating system are possible. As a result, the execution and the protection of the mirrored portion of the security-critical operating system take place in separate memories and are thus separated from each other.

In a preferred embodiment, the at least one working memory area is mirrored automatically and in parallel into the shadow memory by the shadow memory manager. In this way, it can be ensured that there is no difference between the at least one working memory area and the corresponding shadow memory area, whereby monitoring the shadow memory area is equivalent to monitoring the working memory area.

In a further embodiment, at least one working memory area, which stores at least a portion of a comfort system, is mirrored from the working memory into the shadow memory by the shadow memory manager. Of course, the method can be executed for any working memory areas of the working memory, i.e., even those in which portions of a comfort program or portions of a hypervisor are stored.

In some embodiments, the shadow memory manager is configured with a configuration list that defines at least one working memory area to be mirrored into the shadow memory. The configuration list is a suitable means for determining the effect of the shadow memory manager. The configuration list can comprise one or more working memory areas that are mirrored by the shadow memory manager into the shadow memory.

In some embodiments, the shadow memory manager is configured, and so a summed memory capacity of the working memory areas to be mirrored is smaller than a total memory capacity of the working memory. In this configuration, not all working memory areas are thus mirrored. For example, it is possible to forego a mirroring of those working memory areas which do not store any portions of a security-critical operating system.

In some embodiments, the shadow memory manager is configured during a start-up of the control device or protected during the operation of the control device. In this way, an attack on the configuration list can be prevented during the configuration.

In some embodiments, an accessing of a working memory area storing at least a portion of a comfort system is monitored by a hypervisor and/or an accessing of a shadow memory area, which corresponds to a working memory area storing at least a portion of the at least one security system, is monitored by a security inspector. The hypervisor constitutes a suitable protection system for portions of non-security-critical operating systems which are stored in working memory areas, where they can be monitored directly. However, for portions of security-critical operating systems, a dedicated protection inspector, which is different from the hypervisor, is advantageous as a specific protection system. The protection inspector monitors only the shadow memory. Unlike the hypervisor, it can thus not be irregularly modified by a portion of an operating system stored in a working memory area.

In some embodiments, at least one operating system of a security system or comfort system stored in the working memory is executed by at least one dedicated processor which is exclusively assigned to the operating system. In this way, an isolation of an operating system of a security system from operating systems of comfort systems is also achieved on the processor side, which is accompanied by a further improvement of the protection of the security-critical operating system.

A subject matter of the disclosure is also an integrated semiconductor circuit for protecting a security system from an irregular modification, comprising, in an integrated topology, a working memory for storing at least one operating system of a security system and at least one operating system of a comfort system, at least one processor for executing the at least one operating system of the security system and the at least one operating system of the comfort system, and a shadow memory manager which is configured to mirror at least one working memory area, which stores a portion of the operating system of the security system, from the working memory into a shadow memory, according to some embodiment of the present disclosure. With a highly integrated semiconductor circuit which, by means of a shadow memory manager, allows for an indirect monitoring of a working memory area which stores a portion of a security-critical operating system, portions of a security-critical operating system can be monitored separately from portions of an operating system of a comfort system. Advantageously, the shadow memory manager is realized as a part of the semiconductor circuit in a hardware. This achieves the highest possible speed when mirroring working memory areas.

In some embodiments, the semiconductor circuit comprises a configuration list of the shadow memory manager. A configuration list realized in a hardware cannot be modified by an operating system. As a result, the configuration list is effectively protected against modification, particularly an attack.

In some embodiments, the semiconductor circuit comprises the shadow memory, and particularly a memory capacity of the shadow memory is smaller than a memory capacity of the working memory, or the shadow memory manager is configured to mirror the at least one working memory area into an external shadow memory, particularly a double data rate (DDR) memory module, which is controllable by the semiconductor circuit or externally, and has particularly a storage capacity which is smaller than a storage capacity of the working memory. Accordingly, several different forms of realization come into consideration for the shadow memory. One option is that of providing the shadow memory in the course of the SoC design as part of the highly integrated semiconductor circuit. Alternatively, it can also be realized by an external memory module. For economic and functional reasons, the shadow memory should not be oversized. It only has to be sufficiently dimensioned to accommodate specific portions of security-critical operating systems.

In the drawings, the disclosure is depicted schematically by means of embodiments and shall be further described with reference to the drawings.

FIG. 1 shows a schematic block diagram of a nonpractical semiconductor circuit 10 for a control device of a vehicle. The highly integrated SoC semiconductor circuit 10 comprises a physical functional hardware 11 which stores and executes a hypervisor 80, an operating system 50 of a security system of the vehicle, and an operating system 60 of a comfort system of the vehicle. During operation of the semiconductor circuit 10, the hypervisor 80 monitors memory accesses of the security-critical operating system 50 as well as memory accesses of the comfort-related operating system 60. However, the hypervisor 80 can be modified and corrupted by the operating systems 50 or 60. In addition, the monitoring of the security-critical operating system 50 by the hypervisor 80 can prevent a correct execution of the security-critical operating system 50. In this embodiment, the hypervisor 80 would additionally need to be ASIL certified prior to the initial start-up and for each update in order to confirm compliance of the hypervisor 80 with the international standard ISO 26262 with respect to the security-critical operating system.

Figure 2:
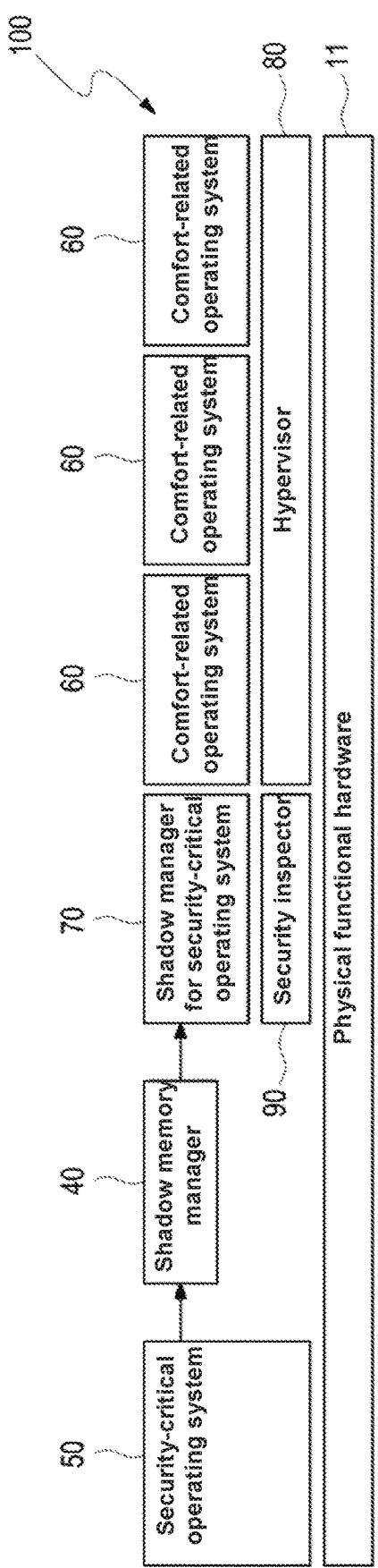
FIG. 2 shows a schematic block diagram of a semiconductor circuit, according to some embodiments of the disclosure.

FIG. 2 shows a schematic block diagram of a semiconductor circuit 100 according to some embodiments of the disclosure. Analogously to the semiconductor circuit 10 shown in FIG. 1, the highly integrated SoC semiconductor circuit 100 comprises a physical functional hardware 11 which simultaneously stores and executes in parallel a hypervisor 80, an operating system 50 of a security system of the vehicle, and three operating systems 60 of comfort systems of the vehicle. In contrast to the semiconductor circuit shown in FIG. 1, the semiconductor circuit 100 additionally comprises a separate shadow memory 70 and a shadow memory manager 40 which is configured to mirror the security-critical operating system 50 into the shadow memory 70. The semiconductor circuit 100 further comprises a security inspector 90 which is a protection system for the shadow memory 70 and designed separately from the hypervisor 80.

During operation of the semiconductor circuit 100, the shadow memory manager 40 mirrors the security-critical operating system 50 into the shadow memory 70 which is monitored by the security inspector 90. As shown in FIG. 1, the three comfort-related operating systems 60 are monitored by the hypervisor 80.

Figure 3:
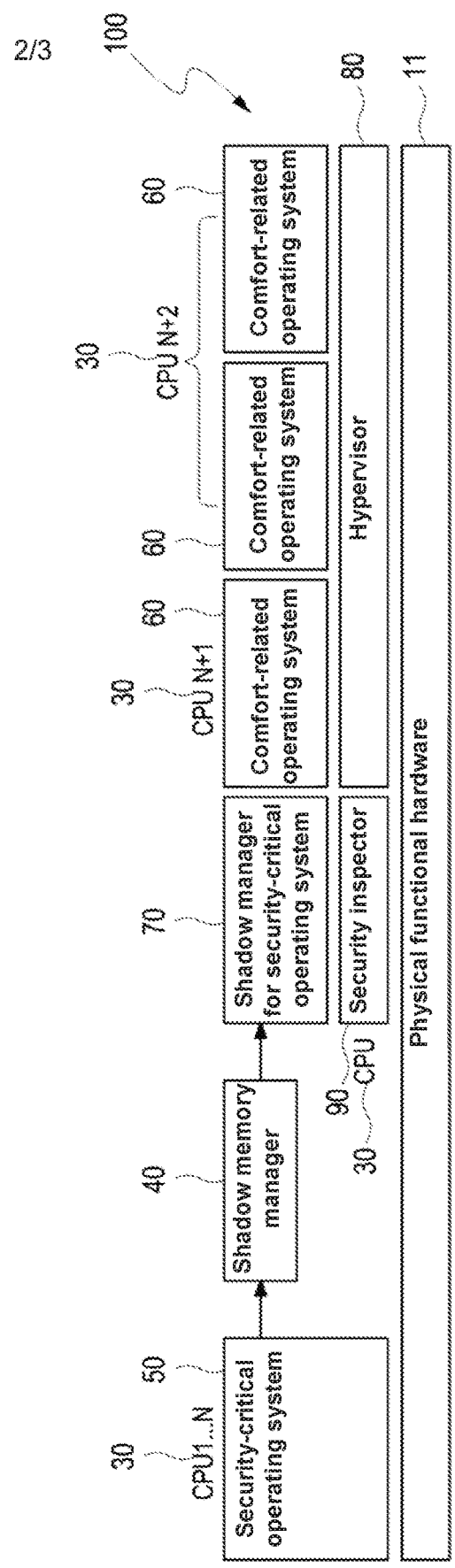
FIG. 3 shows a schematic block diagram of a semiconductor circuit with associated processors, according to some embodiments of the disclosure.

FIG. 3 shows a schematic block diagram of the semiconductor circuit 100 shown in FIG. 2 with associated processors. In this embodiment, each processor 30 is associated with the security-critical operating system 50, the security inspector 90, a comfort-related operating system 60, and two comfort-related operating systems 60.

Figure 4:
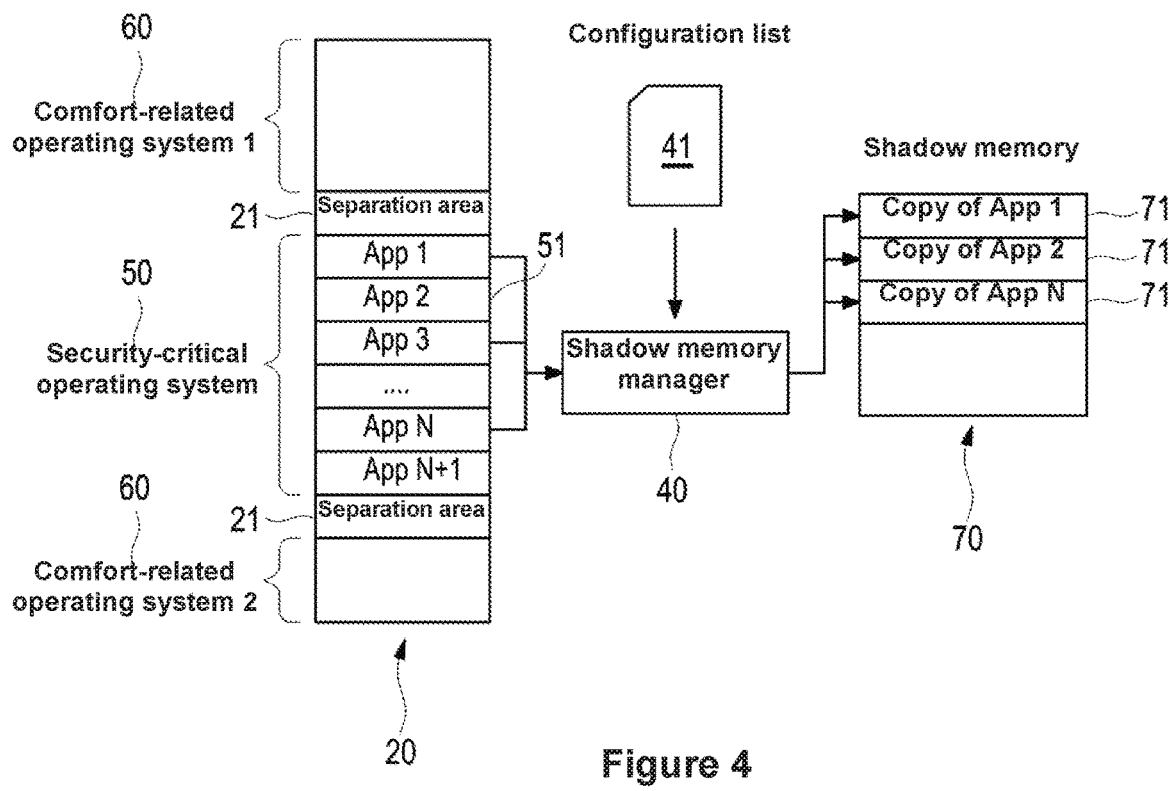
FIG. 4 shows a schematic detailed depiction of a mode of operation of a first configuration list, according to some embodiments of the disclosure.

FIG. 4 shows a schematic detailed depiction of a mode of operation of a first configuration list 41 according to some embodiments of the disclosure. A security-critical operating system 50 and two comfort-related operating systems 60 are stored in a working memory 20. The security-critical operating system 50 is separated from each of the two comfort-related operating systems 60 by a separation area 21. The security-critical operating system 50 includes several portions App 1, App 2, App 3, . . . , App N, App N+1, which constitute individual application programs and are stored in a working memory area 51. A shadow memory manager 40 has a configuration list 41 which comprises three working memory areas 51 in which the portions App 1, App 3, ..., and App N of the security-critical operating system 50 are stored.

During operation, the shadow memory manager 40 mirrors the working memory areas 51 defined in the configuration list 41 into a shadow memory 70, in which copies of the mirrored working memory areas 51 are stored in corresponding shadow memory areas 71.

Figure 5:
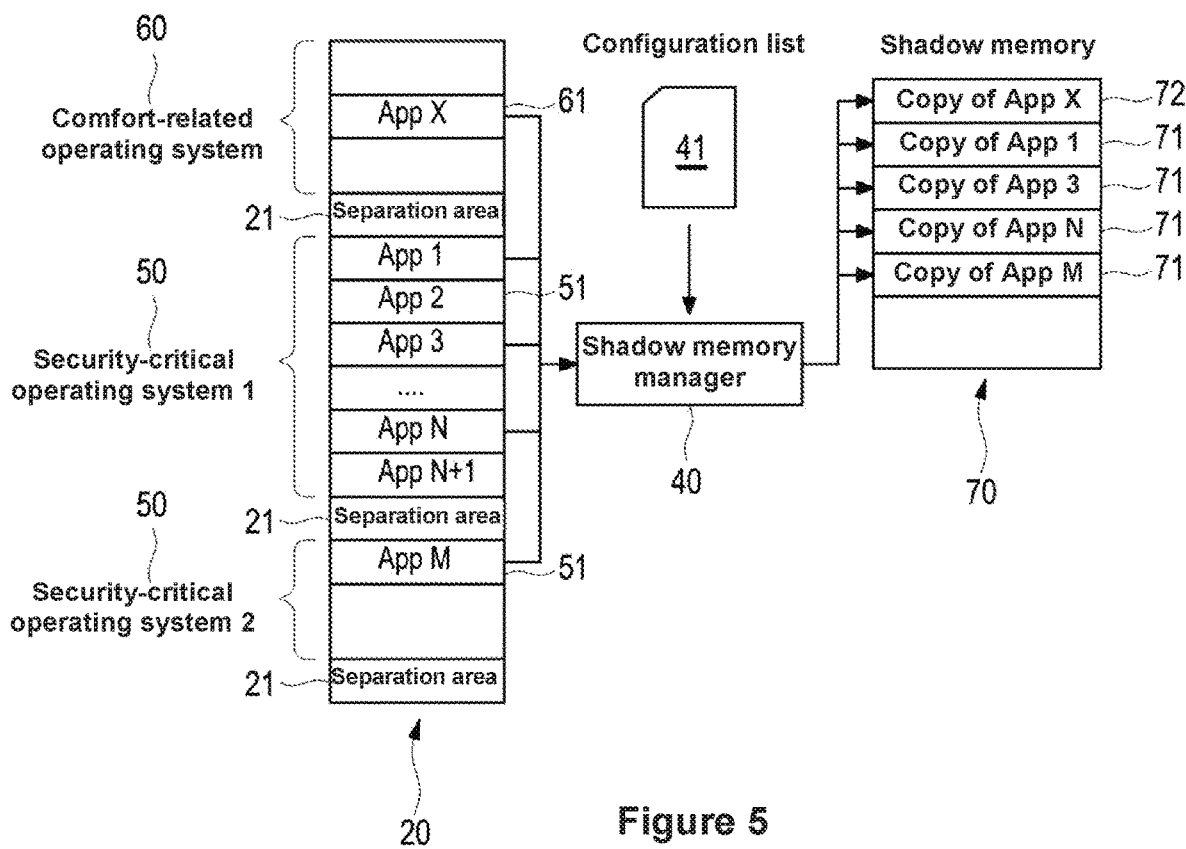
FIG. 5 shows a schematic detailed depiction of a mode of operation of a second configuration list, according to some embodiments of the disclosure.

FIG. 5 shows a detailed schematic depiction of a mode of operation of a second configuration list 41 according to some embodiments of the disclosure. In contrast to FIG. 4, a first security-critical operating system 50, a second security-critical operating system 50, and a comfort-related operating system 60 are stored in the working memory 20. The second security-critical operating system 50 comprises a portion App M, which is stored in a working memory area 51, and the comfort-related operating system 60 comprises a portion App X, which is stored in a working memory area 61.

The configuration list 41 comprises five working memory areas 51, 61, in which the portions App 1, App2, App 3, ..., and App N of the first security-critical operating system 50, a portion App M of the second security-critical operating system 50, and a portion App X of the comfort-related operating system 60 are stored.

During operation, the shadow memory manager 40 mirrors the working memory areas 51, 61 defined in the configuration list 41 into the shadow memory 70, in which copies of the mirrored working memory areas 51, 61 are stored in corresponding shadow memory areas 71, 72.

A significant advantage of the method according to the disclosure is that portions of a security-critical operating system 50 are not monitored directly in the working memory 20 but in a mirrored manner in the shadow memory 70. It is further advantageous because a separate security inspector 90 is used for protecting the shadow memory 70, the separate security inspector 90 being different from the hypervisor 80 provided for protecting comfort-related operating systems. In this manner, a clean separation between the protection of security-critical operating systems and comfort-related operating systems is achieved.

LIST OF REFERENCE SIGNS

10 Semiconductor circuit (prior art)
100 Semiconductor circuit
11 Physical functional hardware
20 Working memory
21 Separation area
30 Processor
40 Shadow memory manager
41 Configuration list
50 Operating system of a security system
51 Working memory area with a portion of the security-critical operating system stored therein
60 Operating system of a comfort system
61 Working memory area with a portion of the comfort-related operating system stored therein
70 Shadow memory
71 Shadow memory area with a portion of the security-critical operating system mirrored therein
72 Shadow memory area with a portion of the comfort-related operating system mirrored therein
80 Hypervisor
90 Security inspector

The invention claimed is:

1. A method for protecting an operating system of a security system in a vehicle against irregular modification, comprising:
   storing the operating system of the security system in a working memory of a control device of the vehicle;
   storing, in a first working memory area of the working memory, at least a portion of the operating system of the security system;
   mirroring, by a shadow memory manager, the first working memory area from the working memory into a shadow memory; and
   monitoring a shadow memory area within the shadow memory, the shadow memory area corresponding to the mirrored first working memory area.

2. The method according to claim 1, wherein the mirroring includes:
   mirroring, automatically and in parallel, the first working memory area from the working memory into the shadow memory by the shadow memory manager.

3. The method according to claim 1, further comprising:
   storing, in a second working memory area of the working memory, at least a portion of an operating system of a comfort system; and
   mirroring, by the shadow memory manager, the second working memory area from the working memory into the shadow memory.

4. The method according to claim 3, further comprising:
   configuring the shadow memory manager with a configuration list; and
   defining, by the shadow memory manager, the first and second working memory areas to be mirrored into the shadow memory.

5. The method according to claim 3, further comprising:
   configuring the shadow memory manager such that a summed memory capacity of the first and second working memory areas to be mirrored is smaller than a total memory capacity of the working memory.

6. The method according to claim 3, further comprising:
   monitoring, by a hypervisor, an accessing of the second working memory area.

7. The method according to claim 1, further comprising:
   monitoring, by a security inspector, an accessing of the shadow memory area, wherein the shadow memory area corresponds to the mirrored first working memory area that stores the at least a portion of the operating system of the security system.

8. The method according to claim 1, further comprising:
   configuring the shadow memory manager during a start-up of the control device.

9. The method according to claim 1, further comprising:
   protecting the shadow memory manager during an operation of the control device.

10. The method according to claim 1, further comprising:
    assigning, exclusively, a dedicated processor to the operating system of the security system stored in the working memory; and
    executing, by the dedicated processor, the operating system of the security system.

11. A semiconductor circuit for protecting a security system in a vehicle from an irregular modification, comprising:
    a working memory configured to store an operating system of the security system and an operating system of a comfort system, the working memory further configured to store at least a portion of the operating system of the security system in a working memory area within the working memory;

a processor configured to execute the operating system of the security system and the operating system of the comfort system;

a shadow memory comprising a shadow memory area within the shadow memory;

a shadow memory manager configured to mirror the working memory area into the shadow memory; and a security inspector configured to monitor an accessing of the shadow memory area, wherein the shadow memory area corresponds to the mirrored working memory area, wherein the working memory, the processor, the shadow memory, the shadow memory manager, and the security inspector are within an integrated topology within the semiconductor circuit.

12. The semiconductor circuit according to claim 11, further comprising:

a configuration list of the shadow memory manager.

13. The semiconductor circuit according to claim 11, wherein the shadow memory comprises a memory capacity smaller than a memory capacity of the working memory.

14. The semiconductor circuit according to claim 11, wherein the shadow memory is external to the semiconductor circuit, and is controllable by the semiconductor circuit.

15. The semiconductor circuit according to claim 14, wherein the shadow memory is a double data rate (DDR) memory module.

16. The semiconductor circuit according to claim 14, wherein the shadow memory comprises a storage capacity smaller than a storage capacity of the working memory.

\* \* \* \* \*